US007142979B1

(12) United States Patent
Shonk

(10) Patent No.: US 7,142,979 B1
(45) Date of Patent: Nov. 28, 2006

(54) METHOD OF TRIGGERING THE TRANSMISSION OF DATA FROM A MOBILE ASSET

(75) Inventor: Carl W. Shonk, Shepherd, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 50 days.

(21) Appl. No.: 09/598,538

(22) Filed: Jun. 21, 2000

(51) Int. Cl.
*G01S 13/66* (2006.01)
*G08G 1/01* (2006.01)

(52) U.S. Cl. ....................... 701/208; 701/209; 340/990

(58) Field of Classification Search ................ 701/207, 701/209, 200, 208, 213, 214; 340/990, 995, 340/988, 989, 993; 342/457, 451, 357.08, 342/357.13
See application file for complete search history.

(56) References Cited

U.S. PATENT DOCUMENTS

| | | | | | |
|---|---|---|---|---|---|
| 4,024,493 | A | * | 5/1977 | Ingels | 340/23 |
| 4,388,608 | A | | 6/1983 | Bernard | 340/24 |
| 4,630,227 | A | | 12/1986 | Hagenbuch | 364/567 |
| 4,831,539 | A | | 5/1989 | Hagenbuch | 364/449 |
| 4,884,208 | A | * | 11/1989 | Marinelli et al. | 364/460 |
| 5,428,546 | A | | 6/1995 | Shah et al. | 364/449 |
| 5,438,329 | A | * | 8/1995 | Gastouniotis et al. | 340/870.02 |
| 5,493,694 | A | | 2/1996 | Vlcek et al. | 455/53.1 |
| 5,523,765 | A | * | 6/1996 | Ichikawa | 342/451 |
| 5,594,650 | A | | 1/1997 | Shah et al. | 364/449.1 |
| 5,598,167 | A | * | 1/1997 | Zijderhand | 342/457 |
| 5,610,821 | A | * | 3/1997 | Gazis et al. | 364/44.2 |
| 5,636,122 | A | | 6/1997 | Shah et al. | 364/449.1 |
| 5,638,077 | A | | 6/1997 | Martin | 342/357 |
| 5,742,509 | A | * | 4/1998 | Goldberg et al. | 364/449.5 |
| 5,751,245 | A | | 5/1998 | Janky et al. | 342/357 |
| 5,758,313 | A | | 5/1998 | Shah et al. | 701/208 |
| 5,760,742 | A | * | 6/1998 | Branch et al. | 342/457 |
| 5,774,829 | A | * | 6/1998 | Cisneros et al. | 701/213 |
| 5,822,712 | A | * | 10/1998 | Olsson | 701/117 |
| 5,902,351 | A | | 5/1999 | Streit et al. | 701/220 |
| 5,904,727 | A | | 5/1999 | Prabhakaran | 701/208 |
| 5,922,040 | A | | 7/1999 | Prabhakaran | 701/117 |
| 5,945,919 | A | | 8/1999 | Trask | 340/825.491 |

(Continued)

FOREIGN PATENT DOCUMENTS

| | | | |
|---|---|---|---|
| EP | 0745959 | A2 | 12/1996 |

(Continued)

*Primary Examiner*—Dalena Tran
(74) *Attorney, Agent, or Firm*—Lowe Hauptman & Berner, LLP

(57) ABSTRACT

A navigation system that uses a method for transmitting the location of a vehicle to a location remote from the vehicle is provided. The method includes determining a location of the vehicle relative to a road network defined as a first location, and determining a change in the location of the vehicle relative to the road network defined as a second location. The first location may be a first street while the second location is a second street different that the first street. The navigation system then communicates the location of the vehicle to the remote location when vehicle reaches the second location. In another aspect of the present invention, the method includes determining a location of the vehicle relative to a road network defined as a first location. A new location of the vehicle is determined relative to the road network and is defined as a second location. The first location of the vehicle is communicated to the remote location at a first frequency, and the second location of the vehicle is communicated to the remote location at a second frequency, which is different from the first frequency.

29 Claims, 2 Drawing Sheets

U.S. PATENT DOCUMENTS

| | | | | |
|---|---|---|---|---|
| 5,948,043 | A * | 9/1999 | Mathis | 701/208 |
| 6,094,164 | A * | 7/2000 | Murphy | 342/357.07 |
| 6,188,939 | B1 * | 2/2001 | Morgan et al. | 701/36 |
| 6,192,312 | B1 * | 2/2001 | Hummelsheim | 701/118 |
| 6,192,314 | B1 * | 2/2001 | Khavakh et al. | 701/209 |
| 6,321,091 | B1 * | 11/2001 | Holland | 455/456 |
| 6,339,745 | B1 * | 1/2002 | Novik | 701/208 |
| 6,356,836 | B1 * | 3/2002 | Adolph | 701/208 |
| 6,401,027 | B1 * | 6/2002 | Xu et al. | 701/117 |

FOREIGN PATENT DOCUMENTS

| | | |
|---|---|---|
| WO | WO 00/34932 | 6/2000 |

* cited by examiner

METHOD OF TRIGGERING THE TRANSMISSION OF DATA FROM A MOBILE ASSET

BACKGROUND OF THE INVENTION

The present invention relates generally to vehicle positioning systems and more particularly to a method of triggering the vehicle positioning system to transmit the vehicle location to a remote location.

Several types of known vehicle positioning systems transmit the position of a remote vehicle to another location. For example, an emergency assistance request system on a vehicle transmits the location of the vehicle to an emergency assistance dispatch station along with a request for assistance. As another example, vehicle positioning systems are installed on fleets of vehicles so that their location and progress can be tracked from a central location.

These known systems use Global Positioning System (GPS) position solutions, generally in conjunction with other sensors, to obtain an estimated position. This solution is generally in terms of a standard navigational reference frame, for example WGS-84 (World Geodetic System—latitude and longitude), earth-centered-earth-fixed (ECEF). Many such coordinate systems or reference frames have been developed and are used by the military and by civilians for navigation and more generally to describe a position on earth.

It is desirable to provide timely vehicle location updates to the remote location. However, more frequent transmission than necessary increases cost and lowers communications channel capacity which may result in increased time necessary to receive the vehicle location data. Previously, the vehicle location has been transmitted to the remote location at preset intervals or upon request of the remote location. For example, the vehicle location may be sent at hourly intervals. Another method transmits the vehicle location whenever the vehicle changes direction. The problem with these triggering methods is that the transmission is not triggered by any meaningful event, which may result in the vehicle location being transmitted too frequently or not frequently enough.

Vehicle location for services such as fleet management, emergency notification, autonomous vehicle location, etc. can therefore benefit greatly from transmission of the vehicle position triggered by a meaningful event, such as change in information.

SUMMARY OF THE INVENTION AND ADVANTAGES

The present invention provides a navigation system that uses a method for transmitting the location of a vehicle to a location remote from the vehicle. The method includes determining a location of the vehicle relative to a road network defined as a first location, and determining a change in the location of the vehicle relative to the road network defined as a second location. The first location may be a first street while the second location is a second street different that the first street. The navigation system then communicates the location of the vehicle to the remote location when vehicle reaches the second location. In this manner, vehicle location may be communicated to the remote location based on the location of the vehicle.

In another aspect of the present invention, the method includes determining a location of the vehicle relative to a road network defined as a first location. A new location of the vehicle is determined relative to the road network and is defined as a second location. The first location of the vehicle is communicated to the remote location at a first frequency, and the second location of the vehicle is communicated to the remote location at a second frequency, which is different from the first frequency. In this manner, vehicle location information may be communicated to the remote location at different rates depending on the type of location.

Accordingly, the above provides transmission of the vehicle position triggered by a meaningful event thereby reducing cost and time necessary to receive the vehicle location data.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
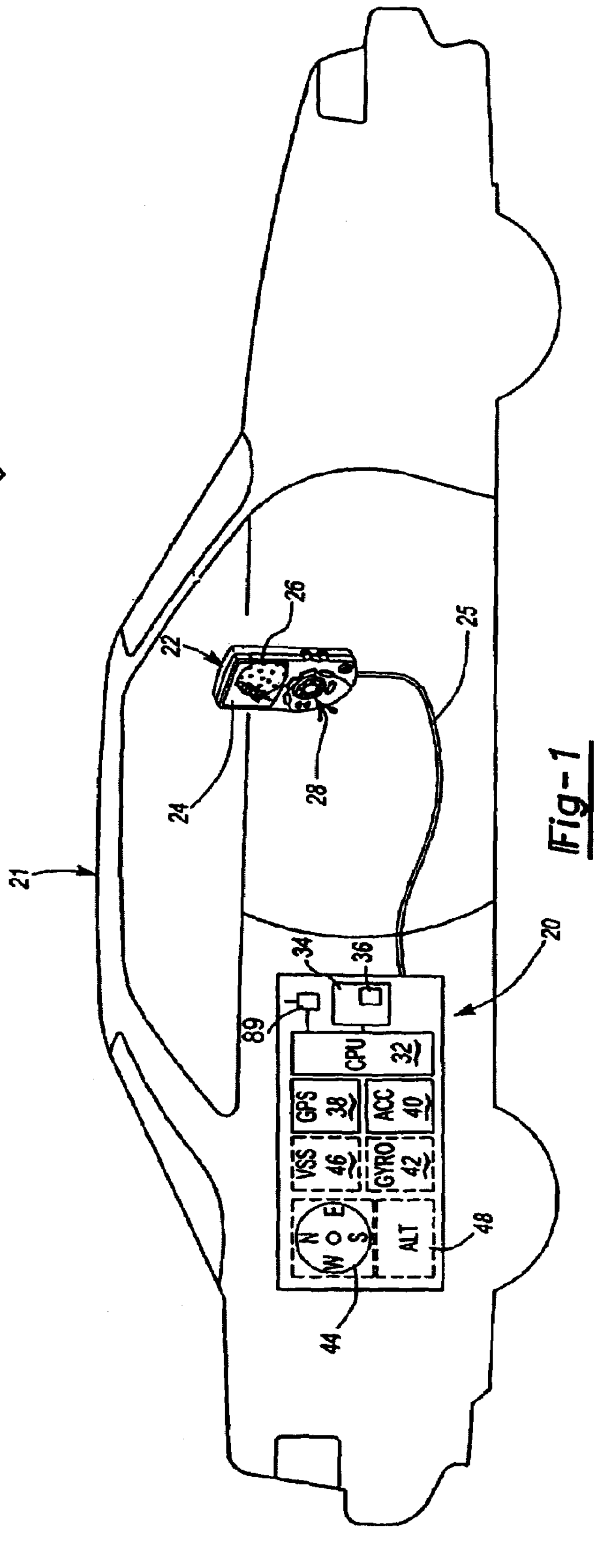
FIG. 1 is a schematic view of the vehicle navigation system of the present invention.

The navigation system 20 of the present invention is shown schematically in FIG. 1 installed in a vehicle 21. The navigation system 20 includes an Operator Interface Module ("OIM") 22 including input and output devices. The OIM 22 includes a display 24, such as a high resolution LCD or flat panel display, and an audio speaker 26. The OIM 22 also includes input devices 28, preferably a plurality of buttons and directional keypad, but alternatively including a mouse, keyboard, keypad, remote device or microphone. Alternatively, the display 24 can be a touch screen display.

The navigation system 20 further includes a computer module 30 connected to the OIM 22. The computer module 30 includes a CPU 32 and storage device 34 connected to the CPU 32. The storage device 34 may include a hard drive, CD ROM, DVD, RAM, ROM or other optically readable storage, magnetic storage or integrated circuit. The storage device 34 contains a database 36 including a map of all the roads in the area to be traveled by the vehicle 21 as well as the locations of potential destinations, such as addresses, hotels, restaurants, or previously stored locations. The software for the CPU 32, including the graphical user interface, route guidance, operating system, position-determining software, etc may also be stored in storage device 34 or alternatively in ROM, RAM or flash memory.

The computer module 30 preferably includes navigation sensors, such as a GPS receiver 38 and an inertial sensor, which is preferably a multi-axis accelerometer 40. The computer module 30 may alternatively or additionally include one or more gyros 42, a compass 44, a wheel speed sensor 46 and altimeter 48, all connected to the CPU 32. Such position and motion determining devices (as well as others) are well known and are commercially available. The navigation system 20 propagates the position of the vehicle 21 relative to the map database 36, i.e. relative positions on road segments and intersections ("nodes"). The navigation system 20 also determines the current location of the vehicle 21 in terms of latitude and longitude. Utilizing any of a variety of known techniques, the position of the vehicle 21 relative to the map database 36 and/or in terms of latitude and longitude is determined at least in part based upon the motion signals from the multi-axis accelerometer 40. The current local time and date can be determined from the GPS signals received by the GPS receiver 38.

Generally, the CPU 32 and position and motion determining devices determine the position of the vehicle 21 relative to the database 36 of roads utilizing dead reckoning, map-matching, etc. Further, as is known in navigation systems, the user can select a destination relative to the database 36 of roads utilizing the input device 28 and the display 24. The navigation system 20 then calculates and displays a recommended route directing the driver of the vehicle 21 to the desired destination. Preferably, the navigation system 20 displays turn-by-turn instructions on display 24 and gives corresponding audible instructions on audio speaker 26, guiding the driver to the desired destination.

Figure 2:
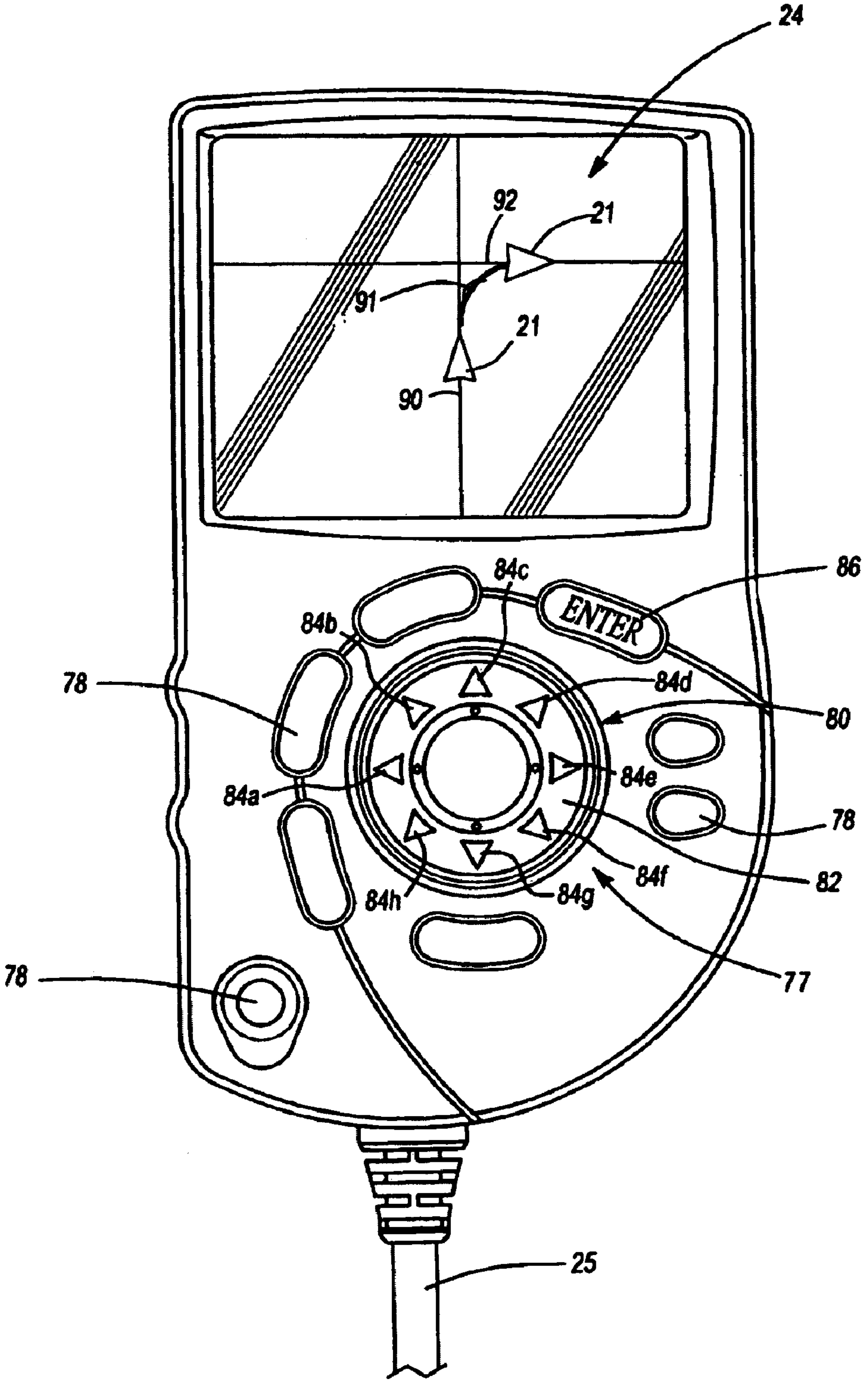
FIG. 2 is a front elevational view of the vehicle navigation system display unit.

FIG. 2 is a perspective view of one disclosed embodiment of the display device 24 and directional input device 77, preferably designed as an integral unit attached to the CPU by connection 25. The display device 24 includes a screen such as a high resolution LCD or flat panel display. The directional input device 77 includes a multiple of input buttons 78 including, preferably, an eight-way button shown generally at 80 and a selection key 86 such as an "Enter" key. Although an eight-way button is shown, it will be realized that other input devices, such as a joystick, mouse or roller ball can be employed.

The internal disk 82 is pivotally mounted in the eight-way button 80 and is capable of moving in the direction of any one of the directional arrows 84. Movement of the internal disk 82 in the direction of one of the directional arrows 84 transmits a directional signal.

The present invention transmits the location of the vehicle to the remote location when the name or other attribute of the street on which the vehicle is driving changes. For example, if the vehicle changes locations as explained in more detail below, a triggering device 89 may transmit vehicle location data. The navigation system 20 may be designed to transmit the data under different circumstances depending upon the particular application. The triggering device may be software on the CPU 32 or any other suitable apparatus.

Depending upon the application, it may be desirable for the triggering device to transmit data when a street address changes or when the vehicle arrives at a particular street address shown on the display 24 in FIG. 2. One aspect of the invention is suppressing communication of the vehicle location when the road that the vehicle is travelling on will not provide significant information. For example, when the vehicle is travelling along a freeway and turns on a ramp to exit to a street, communication of data will be suppressed while the vehicle is travelling along the ramp because communicating vehicle location data while travelling along the ramp is unlikely to provide useful information.

In another embodiment, vehicle location data may be transmitted at a different rate when the street classification changes, e.g., from federal to state highway. Transmitting data with reference to the vehicle location relative to road information provides the remote location with data at a more desirable and meaningful frequency, as opposed to, for example, every ten minutes. For example, when travelling on a rural freeway the location data may be sent every 5 miles while for an urban freeway vehicle location data may be communicated every 1 mile. By way of further example, vehicle location data may be communicated every half mile for a major surface street while for a minor surface street it may be communicated every quarter mile. Additionally, frequency of communicating vehicle location data may also be varied depending upon how high or low the traffic area is, how dense or sparse the road network is, or it may be varied based upon the relative speed limits.

Figure 3:
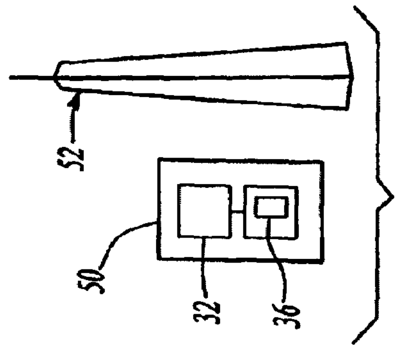
FIG. 3 is an illustration of a navigation system including a remote location and a communication tower or satellite.

Preferably, the present invention is used with map matching to reduce the bandwidth and improve overall operation of the system. In operation, the navigation system 20 of the present invention determines the map-matched position of the vehicle 21 continuously. With reference to FIG. 3, the navigation system 20 then transmits the map-matched position of the vehicle 21 to the remote location 50 via a communication tower or satellite 52 when the location of the vehicle changes. Transmission of the map-matched position requires little bandwidth and can be done on an 'as-needed' basis whereas the alternative of transmitting all the 'real-time' sensor data (acceleration, turn rate, etc.) would generally be impractical.

The position information transmitted by the navigation system 20 to the remote location 50 is preferably with reference to the map database 36, such as a street address, road segment, sub-segment, intersection or a distance and direction from a street address, road segment, sub-segment or intersection. If the remote location 50 includes the same map database 36, then the progress of the vehicle 21 can be monitored, such as on a display. If the remote location 50 is an emergency assistance dispatch station, then emergency assistance can be dispatched to the vehicle location with reference to the road network, i.e. a street address, intersection or a distance and direction from a street address or intersection. As another alternative, or additionally, the remote location 50 could be another vehicle, which would include the CPU 32.

The navigation system 20 of the present invention provides more accurate position information to the remote location 50 because the position is calculated using map-matching. Further, the information is more useful and transmitted more efficiently, because it is given with reference to the map database 36 and consequently, with reference to the real world road network.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method for transmitting the location of a vehicle to a location remote from the vehicle comprising the steps of:

a) determining a street attribute of the vehicle relative to a road network defined as a first location;

b) determining a change in the street attribute of the vehicle relative to the road network defined as a second location; and c) automatically communicating the street attribute of the vehicle to the remote location based upon said change in street attribute including communicating the first location at a first interval frequency, and communicating the second location at a second interval frequency.

2. The method of claim 1 wherein the location of the vehicle is communicated in said step b) with reference to the road network.

3. The method of claim 2 wherein the road network is in a map database.

4. The method of claim 3 wherein the location of the vehicle is determined in said step a) by map-matching.

5. The method of claim 1 wherein a third location is arranged between the first and second locations, and step c) includes communicating the first location at a first interval frequency, suppressing communication of the third location, and communicating the second location at a second interval frequency.

6. The method of claim 1 wherein the first and second interval frequencies are different.

7. The method of claim 1 wherein the first location is a first street and the second location is a second street.

8. The method of claim 1 wherein the first location is a first street address and the second location is a second street address.

9. The method of claim 1 wherein the interval frequencies define a data transmission interval.

10. The method of claim 1, wherein the street attribute is one of street name, street address and street segment, street intersection.

11. The method of claim 1, wherein the first interval frequency is determined based on the street attribute of the vehicle at the first location.

12. The method of claim 1, wherein the second interval frequency is determined based on the street attribute of the vehicle at the second location.

13. The method of claim 1, wherein the second interval frequency is determined based on a comparison between the first location street attribute and the second location street attribute.

14. The method of claim 1, wherein the second interval frequency is modified if the first location street attribute differs from the second location street attribute.

15. The method of claim 1, wherein the second interval frequency differs from the first interval frequency if the first location street attribute differs from the second location street attribute.

16. An apparatus for a navigation system for transmitting the location of a vehicle to a location remote from the vehicle, the apparatus comprising:

at least one position determining device for providing a vehicle location signal;

a database having a map database with a road network;

a processor interconnected to said at least one positioning device and said database for determining the location of the vehicle relative to said map;

a transmitter for producing a transmission signal to the remote location having the location of the vehicle;

a trigger device for triggering said transmission signal, wherein said triggering device determines a street attribute of the vehicle relative to said road network defined as a first location and determines a change in the street attribute of the vehicle relative to said road network defined as a second location, and said trigger device automatically commands said transmitter to produce said transmission signal based upon the change in location, wherein a third location is arranged between the first and second locations, and said trigger device communicates the first location at a first interval frequency, suppressing communication of the third location, and communicates the second location at a second interval frequency.

17. The apparatus of claim 16 wherein the location of the vehicle is communicated in with reference to said road network.

18. The apparatus of claim 17 wherein the location of the vehicle is determined by map-matching.

19. The apparatus of claim 16 wherein a third location is arranged between the first and second locations, and step c) includes communicating the first location at a first interval frequency, suppressing communication of the third location, and communicating the second location at a second interval frequency.

20. The apparatus of claim 16 wherein the first and second interval frequencies are different.

21. The apparatus of claim 16, wherein said interval frequencies define a data transmission interval.

22. The apparatus of claim 16, wherein the street attribute is one of street name, street address and street segment, street intersection.

23. A method for transmitting the location of a vehicle to a location remote from the vehicle comprising the steps of:

a) determining a street attribute of the vehicle relative to a road network defined as a first location;

b) determining a new street attribute of the vehicle relative to the road network defined as a second location;

c) automatically communicating the first location of the vehicle to the remote location at a first interval frequency; and d) automatically communicating the second location of the vehicle to the remote location at a second interval frequency different from the first interval frequency, wherein the first location is a freeway and the second location is a residential street, wherein the first interval frequency is less than the second interval frequency.

24. The method of claim 23, wherein the street attribute is one of street name, street address and street segment, street intersection.

25. A method for transmitting the location of a vehicle to a location remote from the vehicle comprising the steps of:

a) determining a street attribute of the vehicle relative to a road network defined as a first location;

b) determining a new street attribute of the vehicle relative to the road network defined as a second location;

c) automatically communicating the first location of the vehicle to the remote location at a first interval frequency; and d) automatically communicating the second location of the vehicle to the remote location at a second interval frequency different from the first interval frequency, wherein the first location is a high traffic road and the second location is a low traffic road, wherein the first frequency is less than the second frequency.

26. A method for transmitting the location of a vehicle to a location remote from the vehicle comprising the steps of:

a) determining a street attribute of the vehicle relative to a road network defined as a first location;

b) determining a new street attribute of the vehicle relative to the road network defined as a second location;

c) automatically communicating the first location of the vehicle to the remote location at a first interval frequency; and d) automatically communicating the second location of the vehicle to the remote location at a second interval frequency different from the first interval frequency, wherein the first location is part of a dense road network and the second location is part of a sparse road network wherein the first frequency is greater than the second interval frequency.

27. The method of claim 26, wherein the street attribute is one of street name, street address and street segment, street intersection.

28. A method for transmitting the location of a vehicle to a location remote from the vehicle comprising the steps of:

a) determining a street attribute of the vehicle relative to a road network defined as a first location;

b) determining a new street attribute of the vehicle relative to the road network defined as a second location;

c) automatically communicating the first location of the vehicle to the remote location at a first interval frequency; and d) automatically communicating the second location of the vehicle to the remote location at a second interval frequency different from the first interval frequency, wherein the first and second locations have first and second speed limits, respectively, with the first speed limit being greater than the second speed limit, wherein the first interval frequency is less than the second interval frequency.

29. The method of claim 28, wherein the street attribute is one of street name, street address and street segment, street intersection.

* * * * *